(12) United States Patent
Fang et al.

(10) Patent No.: US 11,022,695 B1
(45) Date of Patent: Jun. 1, 2021

(54) GBAS INTEGRITY RISK ALLOCATION SYSTEM BASED ON KEY SATELLITES

(71) Applicant: Beihang University, Beijing (CN)

(72) Inventors: Kun Fang, Beijing (CN); Yanbo Zhu, Beijing (CN); Zhen Gao, Beijing (CN); Zhipeng Wang, Beijing (CN)

(73) Assignee: BEIHANG UNIVERSITY, Beijing (CN)

(*) Notice: Subject to any disclaimer, the term of this patent is extended or adjusted under 35 U.S.C. 154(b) by 0 days.

(21) Appl. No.: 17/012,202

(22) Filed: Sep. 4, 2020

(30) Foreign Application Priority Data

Jul. 8, 2020 (CN) .......................... 202010652385.5

(51) Int. Cl.
| | | |
|---|---|---|
| *G01S 19/20* | (2010.01) | |
| *G01S 19/08* | (2010.01) | |
| *G01S 19/07* | (2010.01) | |
| *G01S 19/23* | (2010.01) | |

(52) U.S. Cl.
CPC ............ *G01S 19/20* (2013.01); *G01S 19/074* (2019.08); *G01S 19/08* (2013.01); *G01S 19/23* (2013.01)

(58) Field of Classification Search
CPC ........ G01S 19/074; G01S 19/08; G01S 19/20; G01S 19/23
See application file for complete search history.

(56) References Cited

U.S. PATENT DOCUMENTS

| | | | |
|---|---|---|---|
| 10,197,678 B1* | 2/2019 | Wang ...................... | G01S 19/20 |
| 2012/0146851 A1* | 6/2012 | Fernandez .............. | G01S 19/02 |
| | | | 342/357.58 |

\* cited by examiner

*Primary Examiner* — Dao L Phan
(74) *Attorney, Agent, or Firm* — Locke Lord LLP; Tim Tingkang Xia, Esq.

(57) ABSTRACT

A GBAS integrity risk allocation system based on key satellites is used to perform a GBAS integrity risk allocation method, including: reading data from an ephemeris at a certain time, and determining numbers of key satellites, key satellite pairs and key satellite groups at a certain time; under H2 hypothesis, allocating the integrity risks by using the fault probability of satellites in key satellite pairs or key satellite groups, where the integrity risks allocated by using the fault probability of satellites in key satellite pairs or key satellite groups include integrity risks caused by dual-receiver fault and integrity risks caused by ranging source fault; under H0 and H1 hypotheses, allocating the integrity risks by using the fault probability of non-key satellites; making an integrity allocation table according to the integrity risk allocation under the H0, H1 and H2 hypotheses.

17 Claims, 6 Drawing Sheets

GBAS INTEGRITY RISK ALLOCATION SYSTEM BASED ON KEY SATELLITES

CROSS-REFERENCE TO RELATED PATENT APPLICATION

This non-provisional application claims priority to and the benefit of, pursuant to 35 U.S.C. § 119(a), patent application Serial No. CN202010652385.5 filed in China on Jul. 8, 2020. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

TECHNICAL FIELD

The present disclosure relates to the technical field of satellite navigation enhancement, and in particular to a GBAS integrity risk allocation system based on key satellites.

BACKGROUND

Global navigation satellite system (GNSS) is an important global navigation source. In the field of civil aviation, several important indexes of navigation system are integrity, continuity, accuracy and availability. Integrity, as a core index, is the key to ensure the safety of an aircraft during precise approach and landing in civil aviation. Integrity is a quality index related to confidence, which can measure the ability to respond in time when the system fails, that is, the ability to effectively inform users to make corresponding preparations. Integrity is a more important index than precision, because it is meaningless to talk about precision without safety, and precision without integrity cannot be applied in practice.

Therefore, in order to improve the integrity of civil navigation, scientific researchers around the world have proposed and built various navigation enhancement systems, such as the Nationwide Differential Global Positioning System (NDGPS), the Local Area Augmentation system (LAAS), and the Wide Area Augmentation system (WAAS) established in the United States, the GPS Aided Geo Augmented Navigation(GAGAN) of India, European Geostationary Navigation Overlay Service(EGNOS) of the European Union and System of Differential Correction and Monitoring(SDCM) of Russia, etc., as well as the Beidou Augmentation system independently developed by China.

When it comes to the integrity of Ground-based Augmentation system (GBAS), the following indicators are often used: alarm time, alarm limit, protection level and risk. The International Civil Aviation Organization (ICAO) pointed out in Annex 10 of its standard document that risk is a kind of probability information provided by the ground subsystem, which describes the event that when a faultless reference receiver processes data, the lateral or vertical relative position error exceeds an allowable range (alarm limit) due to use of any GBAS airborne information, but the corresponding response cannot be made within the maximum alarm time. That is to say, if the error of positioning itself is higher than the corresponding alarm limit and fails to alarm within the alarm time, there will be an integrity risk, which may cause catastrophic accidents, which must be paid attention to. In civil aviation, the integrity risk is related to the flight phase, such as the flight phase ($1 \times 10^{-7}$/hour), the precise approach phase ($2 \times 10^{-7}$/150 s) and the automatic landing phase ($1 \times 10^{-9}$/30 s). Protection level refers to a confidence limit of positioning error in vertical or horizontal direction that can be obtained according to a given confidence probability, and is often compared with the alarm limit.

As for the system structure of GBAS system, there are generally three subsystems: a satellite subsystem for generating ranging signals, a ground subsystem having receivers and capable of providing VHF VDB data broadcasting, and an airborne subsystem of airborne equipment for receiving and processing space signals, whose information is transmitted interactively through a mobile network, a dedicated network or other networks.

As the proposer of GBAS concept and standard, the United States developed a LAAS system as early as 1995, relying on rich research and development experience of Global Positioning System (GPS). RTCA (Radio Technical Commission for Aeronautics) put forward the allocation and processing method of integrity risks in a LAAS related document DO-245A, that is, the risk values are allocated to each subsystem of the navigation system, so as to break up the whole into parts. This allocation method obtains an integrity allocation method and draws an integrity allocation tree. FIG. 1 is a schematic diagram of the integrity allocation tree in existing related documents.

In the DO-245A document, 75% of the integrity of spatial signals is allocated to H2 hypothesis, which is also called unprotected risk. H2 fault hypothesis includes ranging source fault, climate anomaly, multi-receiver fault, ground subsystem failure, etc. Among them, ranging source fault includes signal distortion, low signal power, code carrier separation, excessive satellite acceleration and ephemeris fault. 25% of the spatial signal integrity risk is equally allocated to vertical risks and lateral risks, both of which can be divided into fault-free hypothesis and single receiver fault hypothesis, namely H0 and H1 hypotheses, also called protection level risks, which can be used to calculate the protection level to envelope the correlation errors and are collectively referred to as protection level risks, where the single receiver fault hypothesis is the sum of the risks obtained from each reference receiver fault.

However, the principle of this allocation method is not clearly stated in the allocation method of DO-245A, which only involves the protection level to protect the reference receiver larger than the integrity requirement, so as to reduce the risk brought by the prior probability to an acceptable level and reduce it to the integrity requirement. However, the H2 fault cannot be alleviated by the protection level, so the preset protection level risk value is lower. At present, the calculation method mainly directly infers the integrity risk value of each fault through relevant empirical data or a large number of data sample data, so this method is artificially prescribed probability, which makes the final result fail to reflect the real situation truthfully, and the calculated value of protection level has certain redundancy compared with the real value of the error, which leads to the decrease of system availability.

Therefore, in order to solve the above problems, a GBAS integrity risk allocation method based on key satellites is needed to solve the problem that the calculated value of protection level has certain redundancy compared with the true value of an error, which leads to the decrease of system availability.

SUMMARY

An object of the present disclosure is to provide a GBAS integrity risk allocation system based on key satellites, comprising: a satellite, configured to generate satellite signals; a ground receiver, configured to receive the satellite signals from the satellite, to process the received satellite signals to generate processed data, and to send the processed data; and a user terminal, configured to receive the ground receiver receives satellite signals, processes the received satellite signals, and sends processed data from the ground receiver; wherein the ground receiver is configured to process the satellite signals by the following steps:

reading data from an ephemeris at a certain time, and determining numbers of key satellites, key satellite pairs and key satellite groups at a certain time;

under H2 hypothesis, allocating integrity risks by using a fault probability of satellites in key satellite pairs or key satellite groups, wherein the integrity risks allocated by using the fault probability of satellites in key satellite pairs or key satellite groups comprise integrity risks caused by dual-receiver fault and integrity risks caused by ranging source fault;

under H0 and H1 hypotheses, allocating the integrity risks by using a fault probability of non-key satellites;

making an integrity allocation table according to integrity risk allocation under the H0, H1 and H2 hypotheses.

Preferably, the numbers of key satellites, key satellite pairs and key satellite groups are determined by comparing a vertical protection level with an alarm limit, wherein, when the vertical protection level calculated by an airborne terminal is higher than the alarm limit by removing a satellite from a constellation, then the satellite is one of the key satellites;

when the vertical protection level calculated by the airborne terminal is not higher than the alarm limit by removing the satellite from the constellation, and when two satellites are removed, the vertical protection level calculated by the airborne terminal is higher than the alarm limit by removing two satellites from the constellation, then the two satellites form one of the key satellite pairs; and when the vertical protection level calculated by the airborne terminal is not higher than the alarm limit by removing the two satellites from the constellation, and when the vertical protection level calculated by the airborne terminal is higher than the alarm limit by removing three satellites from the constellation, then the three satellites form one of the key satellite groups.

Preferably, under H2 hypothesis, the integrity risks allocated by using the fault probability of satellites in a key satellite pair or a key satellite group are calculated according to the following formula:

$$IR_{H_2} = P_i P_{md}$$

in which, $IR_{H_2}$ is the integrity risk allocated under the H2 hypothesis, $P_i$ is the fault probability of satellites in a key satellite pair or a key satellite group, and $P_{md}$ is a miss detection rate.

Preferably, the fault probability of the satellites in the key satellite pair or key satellite group is calculated by the following method:

$$P_i = \sum_{j=i}^{c-n} P(c,j) \times \frac{C_k^i \times C_{c-j}^{N-i}}{C_c^N}, i = 2, 3;$$

in which, $P_i$ is the fault probability of the satellites in the key satellite pair or the key satellite group, $P(c,j)$ represents a probability of j fault satellites in c satellites, N represents a number of visible satellites in the constellation, i represents the key satellite pair or the key satellite group, where i=2 represents key satellite pairs, i=3 represents key satellite groups, k represents recovery strategy in Markov transformation process, and C represents a combination number.

Preferably, the miss detection rate $P_{md}$ has the following relationship with a miss detection coefficient $K_{md}$:

$$K_{md} = Q(x)^{-1}(P_{md}/2),$$

$Q(x)^{-1}$ is an inverse function of $Q(x)$, in which, $$Q(x) = \frac{1}{\sqrt{2\pi}} \int_x^\infty e^{-\frac{t^2}{2}} dt,$$

Q represents a right tail function of standard normal distribution, x is a parameter, and t is an integral element;

the miss detection coefficient $K_{md}$, a threshold value and a false alarm rate have the following relationship:

$$K_{md} + K_T = \eta, P_{ffd} = 1 - \Phi(K_T),$$

where $K_{md}$ represents the miss detection coefficient, $K_T$ represents the threshold value, q represents a fault hypothesis offset, $P_{ffd}$ represents the false alarm rate, $\Phi$ represents a left tail function of standard normal distribution, wherein, $$\Phi(x) = \frac{1}{\sqrt{2\pi}} \int_{-\infty}^x e^{-\frac{t^2}{2}} dt,$$

x is the parameter, and t is the integral element.

Preferably, under the H0 and H1 hypotheses, the integrity risks allocated by using the fault probability of non-key satellites are calculated according to the following formula:

$$IR_{H_0 H_1} = IR_{H_0} + IR_{H_1},$$

in which $IR_{H_0}$ represents the integrity risks allocated by the fault probability of non-key satellites under the H0 hypothesis and $IR_{H_1}$ represents the integrity risks allocated by the fault probability of non-key satellites under the H1 hypothesis.

Preferably, the integrity risks allocated by using the fault probability of non-key satellites under the H0 hypothesis satisfy:

$$IR_{H_0} = P_{ffmd},$$

$P_{ffmd}$ is a probability of fault-free miss detection rate, the integrity risks allocated by using the fault probability of non-key satellites under the H1 hypothesis satisfy:

$$IR_{H_1} = P(H_1)P(HMI|H_1),$$

in which $P(H_1)$ is the probability of fault under H1 hypothesis, and $P(HMI|H_1)$ represents a probability of generating dangerous misleading information under the H1 hypothesis;

the probability of generating dangerous misleading information under the H1 hypothesis is calculated by the following formula:

$$P(HMI \mid H_1) =$$

$$3 \int_{-\infty}^{\infty} \int \int_{LB<E_2+E_3<UB} \frac{1}{2\pi\sigma_v\sigma_v} e^{-\frac{E_2^2}{\sigma_v^2} - \frac{E_3^2}{\sigma_v^2}} dE_2 dE_3 \frac{1}{\sqrt{2\pi}\,\sigma_{v1}} e^{-\frac{E_1^2}{\sigma_{v1}^2}} dE_1,$$

in which, $E_1$, $E_2$ and $E_3$ are differential correction values of a receiver No. 1, a receiver No. 2 and a receiver No. 3 respectively, UB and LB are upper and lower bounds of an error sum of the receiver No. 2 and the receiver No. 3, $\sigma_v$ is a vertical error standard deviation, and $\sigma_{v1}$ is a vertical error standard deviation of the receiver No. 1 after differential correction.

Preferably, the integrity risks caused by the dual-receiver fault are expressed by the following method:

$$IR_{2RR\_failures} = P(H_{2RR\_failures})P(HMI \mid H_{2RR\_failures}),$$

in which, $IR_{2RR\_failures}$ represents the integrity risks caused by the dual-receiver fault, $P(H_{2RR\_failures})$ represents the probability of the dual-receiver fault, and $P(HMI \mid H_{2RR\_failures})$ represents the probability of generating dangerous misleading information under the H2 hypothesis.

Preferably, the probability of double receiver fault is calculated by the following formula:

$$P(H_{2RR\_failures}) = \binom{M}{2}\left(\frac{10^{-5}}{M}\right)^2\left(1-\frac{10^{-5}}{M}\right)^{M-2},$$

in which M represents a number of the receivers;

the probability of generating dangerous misleading information under the H2 hypothesis is calculated by the following formula:

$$P(HMI \mid H_{2RR\_failures}) =$$

$$3\int_{-\infty}^{\infty}\int_{-\infty}^{\infty}\int_{LB_2}^{UB_2} \frac{1}{\sqrt{2\pi}\,\sigma_v} e^{-\frac{E_3^2}{2\sigma_v^2}} dE_3 \frac{1}{2\pi\sigma_{v1}\sigma_{v2}\sqrt{1-\rho^2}}$$

$$e^{-\frac{E_1^2}{\sigma_{v1}^2} + \frac{2E_1 E_2}{\sigma_{v1}\sigma_{v2}} - \frac{E_3^2}{2\sigma_v^2}},$$

in which, $E_1$, $E_2$ and $E_3$ are differential correction values of a receiver No. 1, a receiver No. 2 and a receiver No. 3 respectively, $UB_2$ and $LB_2$ are respectively upper and lower bounds of an error of the receiver No. 3, $\sigma_v$ is a vertical error standard deviation, $\sigma_{v1}$ is a vertical error standard deviation of the receiver No. 1 after differential correction, $\sigma_{v2}$ is a vertical error standard deviation of the receiver No. 2 after differential correction, and $\rho$ is a correlation coefficient of the differential correction value $E_1$ and the differential correction value $E_2$.

Preferably, integrity risks caused by ranging source fault are expressed as follows:

$$IR_{RS} = \lambda_{RS\_failures} T_{RSIS} P_{RS\_md},$$

in which, $IR_{RS}$ represents the integrity risks caused by ranging source fault, $\pi_{RS\_failures}$ represents the dangerous failure rate of the ranging source, $T_{RSIS}$ represents the time interval between independent samples of the ranging source signal, and $P_{RS\_md}$ represents the probability of missing fault detection of the ranging source.

According to the GBAS integrity risk allocation method based on key satellites provided by the present disclosure, the redundancy between the calculated value of the protection level and the true value of the error is reduced, and the preset protection level risk value is improved, so that the final result truly reflects the real situation, and the availability of the system is improved.

It should be understood that both the foregoing general description and the following detailed description are exemplary illustrations and explanations, and shall not be used as limitations on what is claimed in the present disclosure.

BRIEF DESCRIPTION OF DRAWINGS

Further objects, functions and advantages of the present disclosure will be elucidated by the following description of embodiments of the present disclosure with reference to the accompanying drawings, in which.

DETAILED DESCRIPTION

Figure 1:
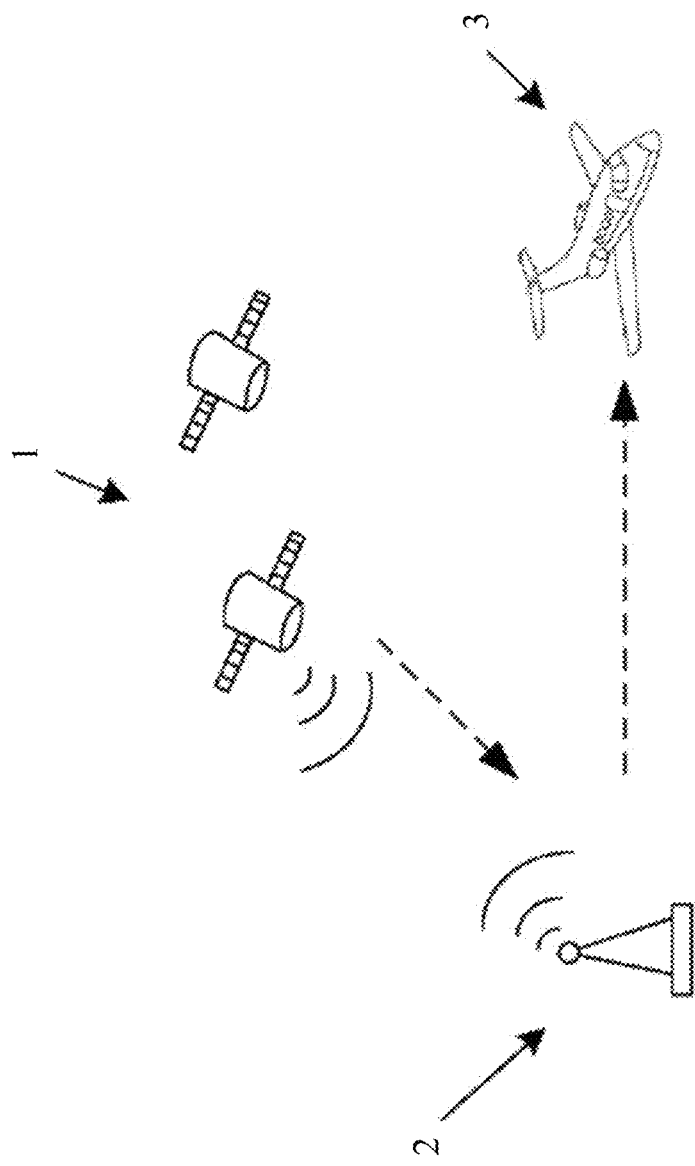
FIG. 1 schematically shows a schematic diagram of an integrity allocation tree in the related art.

By referring to exemplary embodiments, the objects and functions of the present disclosure and methods for achieving these objects and functions will be elucidated. However, the present disclosure is not limited to the exemplary embodiments disclosed below; it can be realized in different forms. The essence of the description is only to help those skilled in the art comprehensively understand the specific details of the disclosure.

Hereinafter, embodiments of the present disclosure will be described with reference to the drawings, and relevant technical terms should be well known to those skilled in the art. In the drawings, the same reference numerals refer to the same or similar components, or the same or similar steps, unless otherwise specified.

Figure 2:
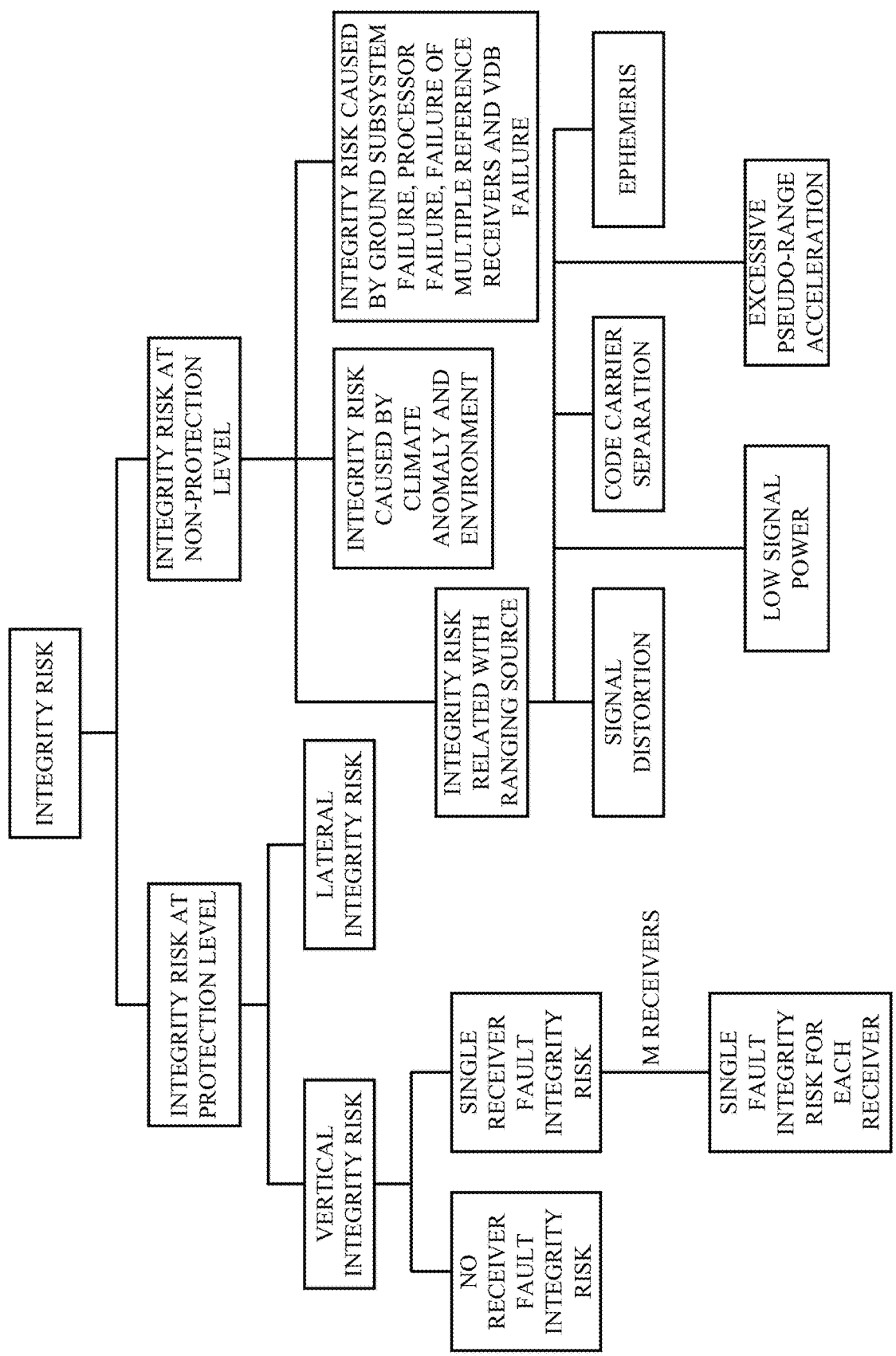
FIG. 2 shows a schematic diagram of a GBAS integrity risk allocation system based on key satellites according to certain embodiments of the present disclosure.

As shown in FIG. 2, a GBAS integrity risk allocation system based on key satellites according to an embodiment of the present disclosure includes a satellite 1, a ground receiver 2 and a user terminal (such as an airplane) 3.

The ground receiver 2 receives satellite signals, processes the received satellite signals, and sends the processed data to the user terminal 3. In some embodiments, the user terminal 3 is not limited to an airplane, but any user who needs to navigate, such as pedestrians and vehicles on the ground.

Figure 3:
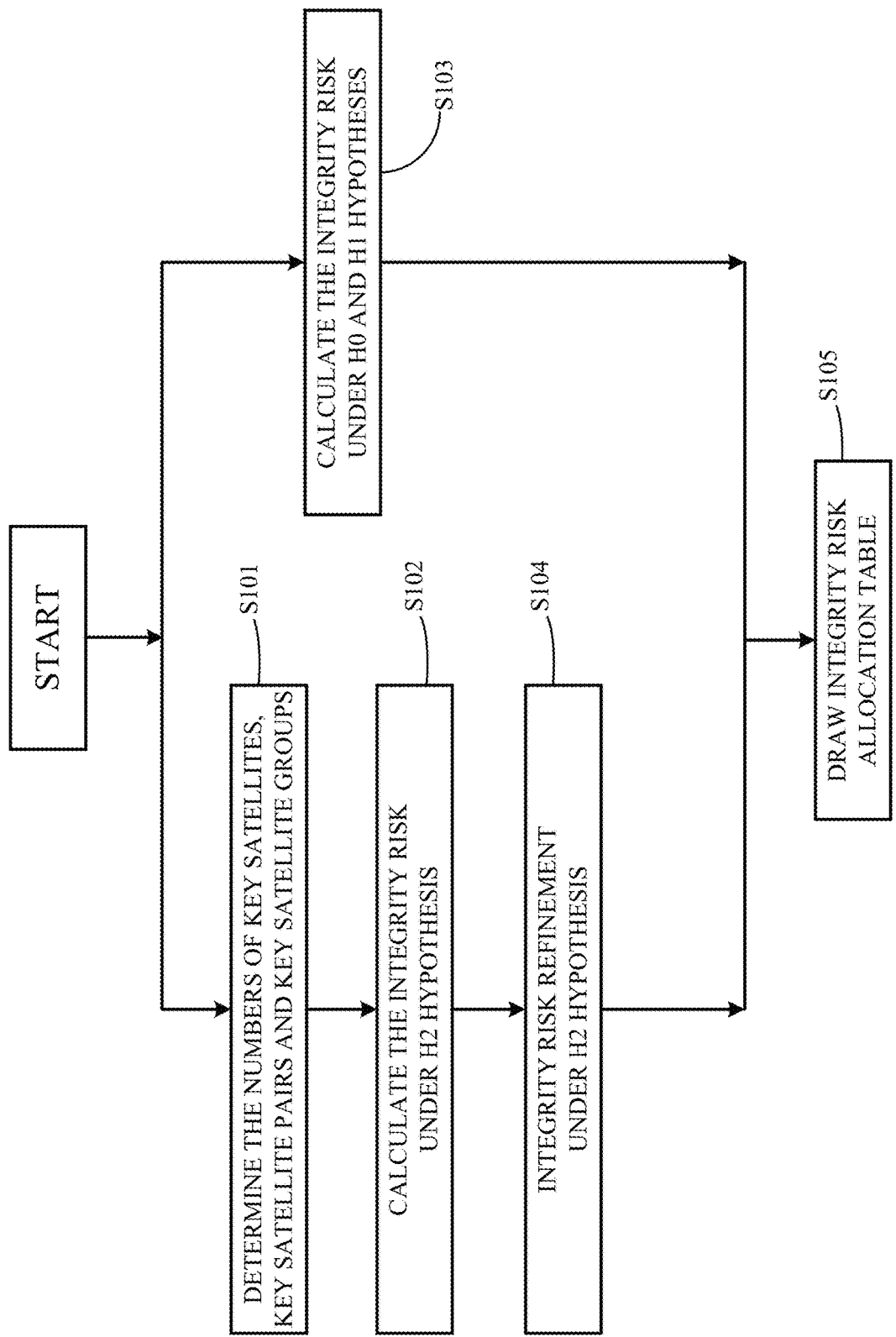
FIG. 3 shows a flow chart of the GBAS integrity risk allocation method based on key satellites according to certain embodiments of the present disclosure.

As shown in FIG. 3, it is a flow chart of the GBAS integrity risk allocation method based on key satellites of the present disclosure. According to an embodiment of the present disclosure, the processing of satellite signals by the ground receiver 2 includes the following method steps: specifically, the GBAS integrity risk allocation method based on key satellites includes:

S101: determining the numbers of key satellites, key satellite pairs and key satellite groups.

Firstly, the concepts of key satellite, key satellite pair and key satellite group are explained. If there is a geometric structure of a certain satellite constellation, the protection level calculated by the airborne terminal is not higher than an alarm limit, that is, no alarm occurs; If a satellite is removed from the constellation, which causes the geometric structure of the satellite to change, so that the protection level calculated by the airborne terminal is higher than the alarm limit and an alarm occurs, then the removed satellite is called a key satellite.

This concept is extended. On the premise that one satellite is removed and the protection level does not exceed the limit, if two or three satellites are removed, so that the protection level calculated by the airborne terminal is higher than the alarm limit and an alarm occurs, then the satellites are called a key satellite pair or a key satellite group; on the premise that two satellites are removed and the protection level does not exceed the limit, three satellites are removed and an alarm occurs, then the satellites are called a key satellite group.

According to the embodiment of the present disclosure, data are read from ephemeris at a certain time, and the numbers of key satellites, key satellite pairs and key satellite groups at a certain time are determined. Specifically, firstly, the data are sampled from ephemeris at a certain time, and the sampling interval, sampling time and satellite shielding angle are set, wherein if the elevation angle is lower than the corresponding satellite shielding angle, the satellite is considered as invisible; on the contrary, it is a visible satellite. Secondly, whether there are key satellites, key satellite pairs or key satellite groups at a certain time in the constellation is judged, and their numbers are counted.

According to the embodiment of the present disclosure, the numbers of key satellites, key satellite pairs and key satellite groups are determined by comparing the protection level in the vertical direction with the alarm limit.

Under H0 hypothesis (no-fault hypothesis), the vertical protection level VPL is calculated by the following method:

$$VPL_{H0} = K_{ffmd}\sqrt{\sum_{i=1}^{N} S_{Apr\_vert,i}^2 \sigma_i^2},$$

and under H1 hypothesis (single receiver fault hypothesis), the vertical protection level VPL is calculated by the following method:

$$VPL_{H_1} = \max\{|B_{j,vert}| + K_{md}\sigma_{vert,H1}\},$$

wherein, $K_{ffmd}$ is a miss detection probability coefficient; $S_{Apr\_vert,I}$ is the projection of the error of the $i^{th}$ ranging source in the vertical direction; $B_{j,vert}$ is the projection of the B value of the $j^{th}$ ranging source; $K_{md}$ is the miss detection probability coefficient; $\sigma_i$ is the standard deviation of pseudo range domain error, and $\sigma_{vert,H1}$ is the standard deviation under H1 hypothesis, wherein, $$B_{j,vert} = \sum_{i=1}^{N} S_{vert,j} B_{i,j},$$

$$\sigma_{vert,H1}^2 = \sum_{i=1}^{N} S_{vert,i}^2 \sigma_{i,H1}^2,$$

$$\sigma_{i,H1}^2 = \frac{M_i}{U_i}\sigma_{pr\_gnd}^2 + \sigma_{others}^2,$$

$S_{vert,j}$ is the vertical projection factor, and $S_{Vert,i}$ is the vertical projection factor of the $i^{th}$ ranging source error; $B_{i,j}$ is the B value of the $i^{th}$ satellite and the $j^{th}$ receiver; $\sigma_{pr\_gnd}$ is the fault-free noise standard deviation provided by the ground for the satellite through VDB, $\sigma_{others}$ is the standard deviation of other items, which is usually smaller than $\sigma_{pr\_gnd}$, $M_i$ is the number of receivers of the $i^{th}$ satellite, $U_i = M_i - 1$.

According to the embodiment of the present disclosure, the vertical protection level VPL is calculated in the above manner, and the numbers of key satellites, key satellite pairs and key satellite groups are determined by comparing the vertical protection level with the alarm limit.

Specifically, when a satellite in the constellation is removed, so that the vertical protection level VPL calculated by the airborne terminal is higher than the alarm limit VAL, then the satellite is a key satellite.

When a satellite in the constellation is removed, the vertical protection level VPL calculated by the airborne end is not higher than the alarm limit VAL, and when two satellites are removed, the vertical protection level VPL calculated by the airborne end is higher than the alarm limit VAL, then the two satellites are a key satellite pair.

When two satellites are removed from the constellation, the vertical protection level VPL calculated by the airborne end is not higher than the alarm limit VAL, and when three satellites are removed, the vertical protection level VPL calculated by the airborne end is higher than the alarm limit VAL, then the three satellites are a key satellite group.

According to the embodiment of the invention, after determining key satellites, key satellite pairs and key satellite groups, the miss detection rate and false alarm rate of key satellites and non-key satellites are analyzed.

Key satellites, key satellite pairs and key satellite groups, as a set of satellites that will affect the alarm, will have risks once they fail and miss detection; however, the failure of other non-key satellites has relatively low impact on the integrity, so it needs to be considered separately. From the point of view of whether the key satellite fails, there are four possible situations, as shown in the following table:

TABLE 1

Analysis of the type of key satellite

| Type of fault | | Key satellite | Non-key satellite |
| --- | --- | --- | --- |
| Correct detection | fault | alarm | not alarm |
| | Fault-free | not alarm | not alarm |
| Error detection | Fault (miss detection) | not alarm | not alarm |
| | fault-free (false alarm) | alarm | not alarm |

As for key satellite pairs and key satellite groups, the above principles can also be used to analyze the miss detection rate and false alarm rate.

Figure 4:
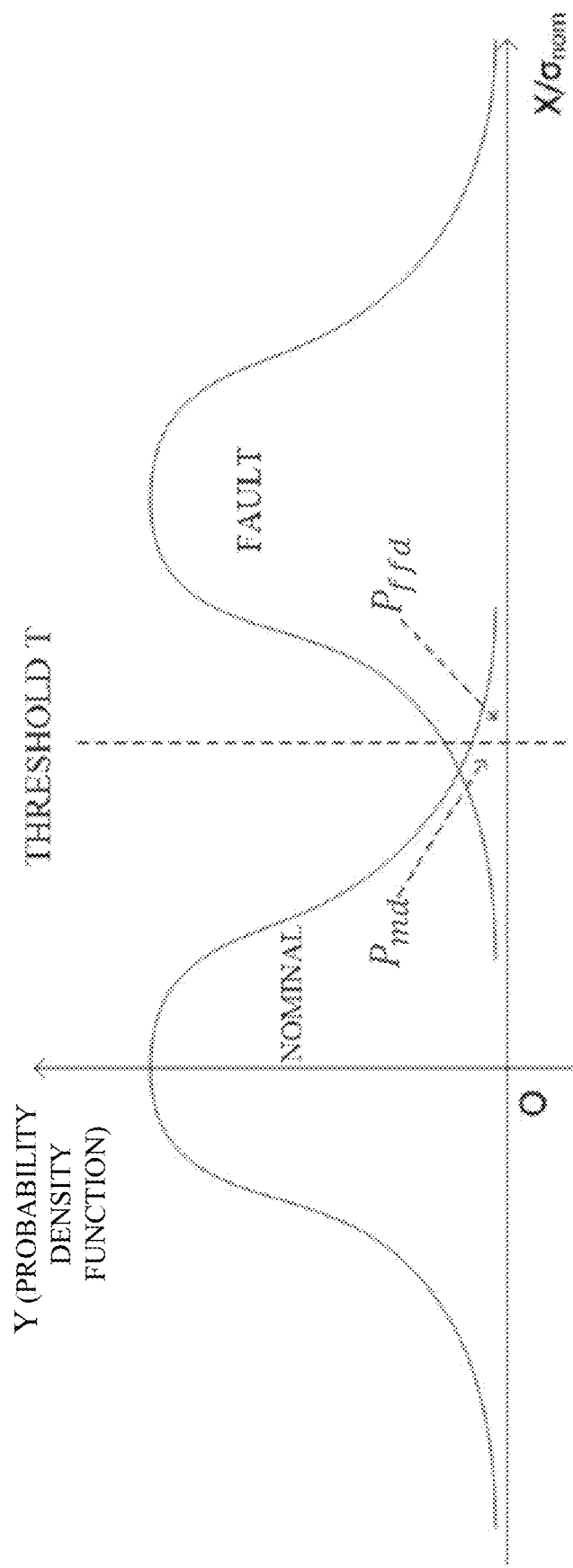
FIG. 4 shows a schematic diagram of the relationship between miss detection rate and false alarm rate of the GBAS integrity risk allocation method based on key satellites according to certain embodiments of the present disclosure.

Whether it is a key satellite or not, the following relationship is obtained:

$$P_{PL>AL}=P_{md} \times P_{fault}+P_{ffd} \times P_{nom},$$

wherein, $P_{PL>AL}$ is the probability that the protection level is greater than the warning limit, $P_{fault}$ and $P_{nom}$ are the probabilities of satellite fault and fault fee, $P_{ffd}$ and $P_{md}$ are the miss detection rate and false detection rate, and the relationship between them is shown in FIG. 4.

S102: calculate the integrity risk under H2 hypothesis.

According to the embodiment of the present disclosure, under the H2 hypothesis (ranging source fault, climate anomaly, multi-receiver fault, ground subsystem failure, etc.), the integrity risks are allocated by using the fault probability of satellites in key satellite pairs or key satellite groups.

For key satellites, the fault probability and fault-free probability of satellites can be preset according to actual requirements, and usually the fault probability of key satellites $Pi=10^{-5}$.

For key satellite pairs and key satellite groups, the satellite fault probabilities in key satellite pairs or key satellite groups do not affect each other, so the simultaneous fault probability of two satellites is the square of the fault probability of a single satellite, and the simultaneous fault probability of three satellites is the cube of the fault probability of a single satellite. However, the faults between satellites often influence each other. Assuming that the fault probabilities of multiple satellites are related, the transition relationship between the nominal state and fault state of satellites can be expressed by Markov state transition.

Figure 5:
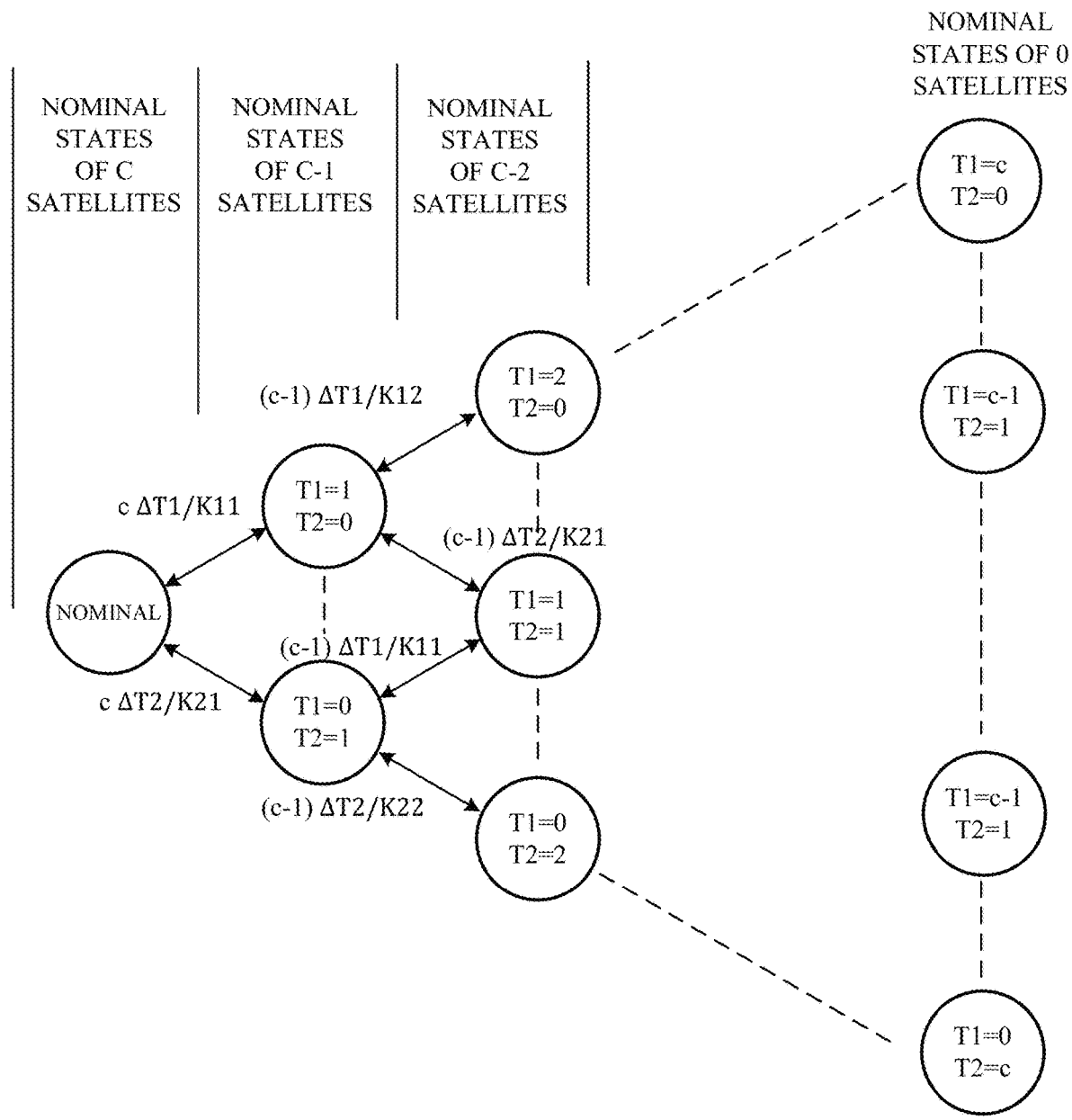
FIG. 5 shows a schematic diagram of solving satellite fault probability and Markov transformation by the GBAS integrity risk allocation method based on key satellites according to certain embodiments of the present disclosure.

As shown in FIG. 5, the GBAS integrity risk allocation method based on key satellites of the present disclosure solves the schematic diagram of satellite fault probability and Markov transformation, assuming that there are C satellites at a certain time, and each satellite has k(k>2) states, that is, there is one fault-free state and k−1 fault states. Therefore, the constellation composed of all satellites can be combined with Markov relations in the following figure.

In FIG. 5, from left to right, m(0≤m≤c) satellites are in nominal state and c-m satellites are in fault state, and the following assumptions are made:

1. The transition of each satellite state is a Markov chain, and it can only be transferred between two kinds of states for each time and only in the direction of arrow.

2. $K_i$ stands for recovery strategy. When $K_i=1$, it means that no matter how many satellites fail, the recovery rate of satellites remains constant.

3. The single satellite state transition coefficients of the two faults are recorded as $\Delta T_1$ and $\Delta T_2$ respectively, which can be estimated by using known values or empirical values.

Let k=3, that is, each satellite has one nominal state and two fault states, and the fault states are represented by T1 and T2, respectively, and the satellite fault and fault-free probabilities in the three states are obtained.

If k=n+1, that is, there are n kinds of fault states, and each kind of fault state is expressed by $T_i$ (i=1 . . . n), then the expression of the probability P(c,O) representing o faults of c satellites is as follows:

$$P(c, O) = \frac{\frac{c!}{O!}\left(\sum_{j_1=0}^{c-O} \sum_{j_2=0}^{c-O-j_1} \cdots \sum_{j_{N-1}=0}^{c-O-\sum_{i=0}^{N-2} j_i} \Delta T_1^{j_1} \Delta T_2^{j_2} \cdots \Delta T_{N-1}^{j_{N-1}}\right)}{1 + \sum_{O=0}^{c-1}\left[\frac{c!}{O!}\left(\sum_{j_1=0}^{c-O} \sum_{j_2=0}^{c-O-j_1} \cdots \sum_{j_{N-1}=0}^{c-O-\sum_{i=0}^{N-2} j_i} \Delta T_1^{j_i} \Delta T_2^{j_2} \cdots \Delta T_{N-1}^{j_{N-1}}\right)\right]},$$

wherein, the recovery index of each type of fault is recorded as $\Delta T_i$ (=1 . . . n) and this method is based on the whole constellation. To calculate the visible satellites, it is necessary to perform permutation and combination.

According to the embodiment of the present disclosure, through the above analysis, the fault probability of the satellites in the key satellite pair or key satellite group is obtained through permutation and combination:

$$P_i = \sum_{j=i}^{c-n} P(c, j) \times \frac{C_k^i \times C_{c-j}^{N-i}}{C_c^N}, i = 2, 3;$$

wherein, $P_i$ is the fault probability of satellites in key satellite pair or key satellite group, P(c,j) represents the fault probability of j satellites in c satellites, n represents the number of visible satellites in constellation, i represents key satellite pair or key satellite group, where i=2 represents key a satellite pair, i=3 represents a key satellite group, k represents recovery strategy in Markov transformation process, and C represents combination number.

According to an embodiment of the present disclosure, under the H2 hypothesis, for key satellite pairs and key satellite groups, the integrity risks are allocated by using the fault probability of satellites in the key satellite pairs or key satellite groups, and are calculated according to the following method:

$$IR_{H_2}=P_i P_{md},$$

wherein, $IR_{H_2}$ is the integrity risk allocated under H2 hypothesis, $P_i$ is the fault probability of satellites in key satellite pairs or key satellite groups, and $P_{md}$ is the miss detection rate.

The miss detection rate $P_{md}$ has the following relationship with the miss detection coefficient $K_{md}$:

$$K_{md}=Q(x)^{-1}(P_{md}/2),$$

$Q(x)^{-1}$ an inverse function of Q(x), wherein, $$Q(x) = \frac{1}{\sqrt{2\pi}} \int_x^\infty e^{-\frac{t^2}{2}} dt,$$

Q represents the right tail function of standard normal distribution, x is the parameter, and t is the integral element;

the miss detection coefficient $K_{md}$, the threshold value and the false alarm rate have the following relationship:

$$K_{md}+K_T=\eta, P_{ffd}=1-\Phi(K_T),$$

wherein, $K_{md}$ represents miss detection coefficient, $K_T$ represents a threshold value, η represents a fault hypothesis offset, $P_{ffd}$ represents false alarm rate, Φ represents the left tail function of standard normal distribution, wherein $$\Phi(x) = \frac{1}{\sqrt{2\pi}} \int_{-\infty}^{x} e^{-\frac{t^2}{2}} dt,$$

X is a parameter, and t is an integral element.

Step S103: Calculate the integrity risk under H0 and H1 hypotheses.

Under H0 and H1 hypotheses, the integrity risks are allocated by using the fault probability of non-key satellites.

It should be noted that step S103 and step S102 are not progressive. In some preferred embodiments, step S102 and step S103 are calculated synchronously.

According to the embodiment of the present disclosure, under the H0 and H1 hypotheses, the integrity risks are allocated by using the fault probability of non-key satellites, and are calculated as follows:

$$IR_{H_0H_1} = IR_{H_0} + IR_{H_1},$$

wherein, $IR_{H_0}$ represents the integrity risks allocated by the fault probability of non-key satellites under H0 hypothesis, and $IR_{H_1}$ represents the integrity risks allocated by the fault probability of non-key satellites under H1 hypothesis.

Among them, the integrity risks allocated by the fault probability of non-key satellites under H0 hypothesis satisfy:

$$IR_{H_0} = P_{ffmd},$$

$P_{ffmd}$ is the probability of fault-free miss detection.

Under the H1 hypothesis, the integrity risks allocated by using the failure probability of non-key satellites satisfy:

$$IR_{H_1} = P(H_1)P(HMI|H_1),$$

wherein, $P(H_1)$ is the probability of fault under H1 hypothesis, $P(HMI|H_1)$ represents the probability of generating dangerous misleading information under H1 hypothesis.

For the calculation of the probability of generating dangerous misleading information under H1 assumption, it is assumed that there are three receivers, and the vertical error brought by the receiver i at a certain moment is $E_i$, and the protection level in this state can be expressed as:

$$VPL = |B_{j,vert}| + K_{md}\sigma_{vert,H1} = \max_i \left|\frac{E_i}{3} - \frac{E_j}{6} - \frac{E_j}{6}\right| + \frac{K_{md}}{\sqrt{2}}\sigma_v$$

$$i, j = 1, 2, 3, i \neq j,$$

wherein, $\sigma_{vert,H1}$ represents the vertical mean under H1 hypothesis, $\sigma_{vert}$ represents the vertical mean under H0 hypothesis, and $B_{j,vert}$ is the projection of B value of the $j^{th}$ ranging source.

$K_{md}$ represents a miss detection coefficient, and its value is unknown. The estimated value of $K_{md}$ is obtained by the original allocation method of integrity H0 and H1:

$$K_{md} = Q^{-1}\left(\frac{3IR_{H_0H_1}}{8P(H_1)}\right),$$

then:

$$\sigma_v^2 = \sum_{i=1}^{N} S_{v,i}^2 \sigma_{pr\_gnd}^2(i),$$

wherein, $\sigma_{pr\_gnd}$ is the standard deviation of fault-free noise provided by the ground for satellites through VDB, and $\sigma_v$ represents the standard deviation of a vertical error.

The vertical error $\sigma_v$ produced by using the average value of differential correction in three receivers is expressed as:

$$E_v = \sum_{k=1}^{3} \frac{E_k}{3},$$

where $E_k$ represents a differential value at the $k^{th}$ receiver.

If receiver 1 is faultless at a certain time, receiver 2 and receiver 3 are faultless, and the upper and lower bounds of the vertical error can be sorted out according to the risk definition.

Specifically, the definition of risk shows that:

$$|E_v| > VAL \text{ and } |VPL| < VAL,$$

the upper and lower bounds of $E_2$ and $E_3$ can be obtained, which are referred to as UB and LB respectively. The vertical errors are all normal distributions, and the fault-free dual receivers satisfy the independent normal distribution with the same parameters, namely:

$$E_1 \sim N(0, \sigma_{v1}),$$

$$(E_2, E_3) \sim N(0, 0, \sigma_v, \sigma_v, 0),$$

where n ( ) is a standard normal distribution.

Finally, the probability of dangerous misleading information under H1 hypothesis is calculated by the following method:

$$P(HMI|H_1) = 3\int_{-\infty}^{\infty} \iint_{LB<E_2+E_3<UB} \frac{1}{2\pi\sigma_v\sigma_v} e^{-\frac{E_2^2}{\sigma_v^2} - \frac{E_3^2}{\sigma_v^2}} dE_2 dE_3 \frac{1}{\sqrt{2\pi}\,\sigma_{v1}} e^{-\frac{E_1^2}{\sigma_{v1}^2}} dE_1,$$

$E_1$, $E_2$ and $E_3$ are the differential correction values of the receiver No. 1, the receiver No. 2 and the receiver No. 3 respectively, UB and LB are the upper and lower bounds of the error sum of the receiver No. 2 and the receiver No. 3, $\sigma_v$ is the vertical error standard deviation, and $\sigma_{v1}$ is the vertical error standard deviation of the receiver No. 1 after differential correction.

The integrity risk under H0 hypothesis and the integrity risk under H1 hypothesis can be solved by the above calculation, so the final $IR_{H_0H_1} = IR_{H_0} + IR_{H_1}$ is solved.

After step S102 and step S103, the integrity risks under H0, H1 and H2 hypotheses are solved.

According to the embodiment of the present disclosure, after solving the integrity risks under H0, H1 and H2 hypotheses, the integrity risks under H2 assumptions are refined.

S104, refinement of integrity risks under H2 hypothesis.

According to the embodiment of the disclosure, the integrity risks are allocated by utilizing the fault probability of the satellites in the key satellite pair or the key satellite group, including the integrity risks caused by the dual-receiver fault and the integrity risks caused by the fault of the ranging source.

Integrity Risks Caused by Dual-Receiver Failure Fault

Since the fault of the multi-reference receiver cannot produce redundant observations, it is impossible to monitor the integrity of the proposed system model. However, in fact, there are some similarities between multi-receiver fault and single-receiver fault, i.e., they can be both enveloped by protection level from the definition. Therefore, the upper limit of integrity risks under dual-receiver fault can be solved by imitating the calculation method of protection level under H1 hypothesis, and the result can be regarded as a quantifiable known value of integrity subsystem risks, which can be regarded as a part of H2 hypothesis.

Since the probability of faults with more than three receivers is very low, the embodiment of the present disclosure only considers the case of double receivers. The integrity risks caused by the fault of dual receivers is expressed as follows:

$$IR_{2RR\_failures} = P(H_{2RR\_failures})P(HMI|H_{2RR\_failures}),$$

wherein, $IR_{2RR\_failures}$ represents the integrity risks caused by dual-receiver fault, $P(H_{2RR\_failures})$ represents the probability of dual receiver fault, and $P(HMI|H_{2RR\_failures})$ represents the probability of dangerous misleading information under H2 hypothesis.

The fault probability of dual receivers is calculated as follows:

$$P(H_{2RR\_failures}) = \binom{M}{2}\left(\frac{10^{-5}}{M}\right)^2\left(1 - \frac{10^{-5}}{M}\right)^{M-2},$$

in which M represents the number of receivers.

For the calculation of the probability of generating dangerous misleading information under H2 hypothesis, it is assumed that there are three receivers, and at a certain moment, receiver No. 1 and receiver No. 2 fail, and receiver 3 does not fail. According to the risk definition, we can get the upper and lower error bounds of receiver No. 3, which are called UB2 and LB2 respectively.

Let both vertical errors be a normal distribution, let both vertical errors be joint normal distribution obeying zero mean, and the nominal receiver error obey normal distribution. That is:

$$(E_1, E_2) \sim N(0, 0, \sigma_{v1}, \sigma_{v2}\rho),$$

$$E_3 \sim N(0, \sigma_v),$$

in which, n (is a standard normal distribution.

Finally, the probability of generating dangerous misleading information under H2 hypothesis is calculated by the following method:

$$P(HMI|H_{2RR\_failures}) = 3\int_{-\infty}^{\infty}\int_{-\infty}^{\infty}\int_{LB_2}^{UB_2} \frac{1}{\sqrt{2\pi\sigma_v}} e^{-\frac{E_3^2}{2\sigma_v^2}} dE_3 \frac{1}{2\pi\sigma_{v1}\sigma_{v2}\sqrt{1-\rho^2}} e^{-\frac{E_1^2}{\sigma_{v1}^2} + \frac{2E_1E_2}{\sigma_{v1}\sigma_{v2}} - \frac{E_3^2}{2\sigma_v^2}},$$

in which E1, E2 and E3 are the differential correction values of receiver No. 1, receiver No. 2 and receiver No. 3 respectively, while UB2 and LB2 are the upper and lower bounds of receiver No. 3 error, $\sigma_v$ is the vertical error standard deviation, $\sigma_{v1}$ is the vertical error standard deviation after differential correction of receiver No. 1, $\sigma_{v2}$ is the vertical error standard deviation after differential correction of receiver No. 2, and $\rho$ is the correlation coefficient between differential correction value $E_1$ and differential correction value $E_2$.

Through the above process, the integrity risks caused by double receiver faults can be obtained when the receiver faults are independent of each other.

In some implementations, because the positioning error does not always follow the Gaussian distribution, the assumed Gaussian distribution model may not be accurate enough, and a reasonable expansion factor may be considered to meet the non-Gaussian integrity risk requirements. In other embodiments, if two receivers fail at the same time, they are generally related, and the results can be adjusted appropriately.

Integrity Risks Caused by Ranging Source Faults

According to the embodiment of the disclosure, the integrity risks caused by the fault of the ranging source are expressed by the following method:

$$IR_{RS} = \lambda_{RS\_failures} T_{RSIS} P_{RS\_md},$$

in which, $IR_{RS}$ represents the integrity risk caused by fault of a ranging source, $\lambda_{RS\_failures}$ represents the dangerous failure rate of the ranging source, $T_{RSIS}$ represents the time interval between independent samples of ranging source signal, and $P_{RS\_md}$ represents the probability of miss fault detection of the ranging source.

The ranging source faults generally include six kinds of faults: low power signal, excessive acceleration, code carrier separation, ephemeris fault and radio frequency interference (RFI). However, radio frequency interference generally does not appear as the risk of ranging source, and corresponding ephemeris protection level exists to envelope ephemeris fault, but they can still be counted in calculation.

Although the integrity risk caused by each type of ranging source fault can be allocated by simple proportional operation, the miss detection rate of each type of fault is difficult to determine. To solve this problem, it is assumed that there are three successive states in time, namely, initial state, capture state and broadcast state, that is, the ranging source is broadcast after capturing the ranging source after the initial state, and each state transition is called an independent integrity check.

Specifically, in order to find a suitable miss detection rate of the ranging source fault at the same time, a Markov chain with three types of state transitions is constructed, as shown in FIG. 5, which is a schematic diagram of Markov transition for solving fault parameters of the ranging source by a GBAS integrity risk allocation method based on key satellites of the present disclosure.

Figure 6:
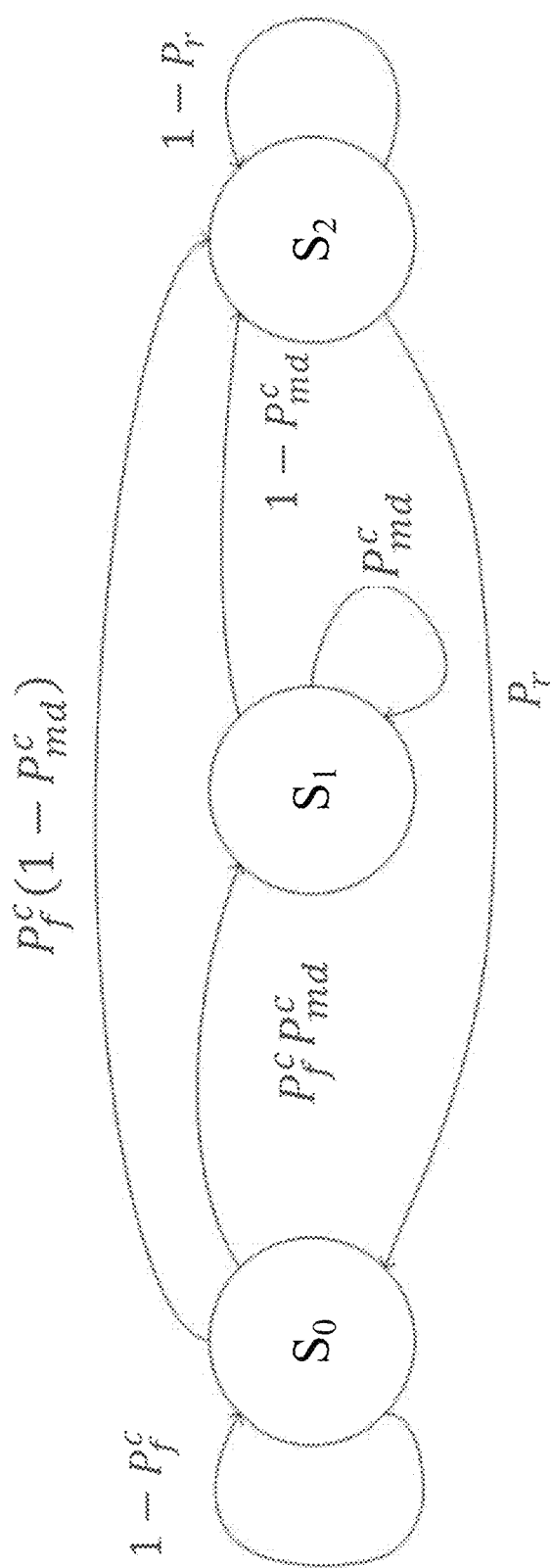
FIG. 6 shows a Markov transformation diagram for solving fault parameters of ranging sources by the GBAS integrity risk allocation method based on key satellites according to certain embodiments of the present disclosure.

As shown in FIG. 6, c stands for fault type; $P^c_f$ is the probability of potential faults of type c between independent integrity checks; $P^c_{md}$ is the probability that faults of type c are not detected; $P_r$ refers to the probability that any fault will be recovered by GPS operation control part between independent integrity checks; $S_j$ represents the probability of the state at a certain time, and j=0 represents the probability that there is no fault c; J=1 represents the probability of faults of type c being not detected; J=2 represents the probability of faults of type c being detected.

After each integrity check, the value of the miss rate is adjusted until it meets the requirements:

$$R(i) = \sum_{s=1}^{5} K_i S_i^5(i) = IR_{reg},$$

in which, $K_i$ is the ratio of preset probability of each type of fault to occurrence of total faults, $IR_{req}$ represents the specified integrity risk value, which is the ratio of a total number of risks of ranging sources to the number of ranging sources, i=1 represents initial state, i=2 capture state, and i=3 represents broadcast state. Finally, the corresponding total risks with margin can be deduced from the corresponding miss detection rate and fault prior probability.

S105: draw an integrity risk allocation table.

After completing steps S101 to S104, the integrity risks under H0, H1 and H2 hypotheses are calculated and solved, and an integrity allocation table is made according to the integrity risk allocation under H0, H1 and H2 hypotheses.

Two allocation solutions are given in the embodiment:

Solution 1: refer to the integrity distribution table of Do-245A and reallocate it in proportion.

Solution 2: carry out sampling simulation to obtain the relevant proportion of different types of faults in the sampling epoch, wherein, the proportions of internal sub-components under of H0 and H1 hypotheses are as follows:

(1) the relationship allocation risks in H0 and H1 are the worst cases and are related to the number of reference receivers. The allocation ratio according to H0 hypothesis and H1 hypothesis is 1: M, and M is the number of reference receivers.

(2) the corresponding $P_{ffmd}$ can be obtained under H0 hypothesis. When allocated to a single reference receiver in each direction under the H1 hypothesis, the risk of this part is divided by the number M of reference receivers, and the averaged fault risk is obtained.

(3) Assume that the probability assumed by H1 is a prior value, and the prior probability is the total prior probability. When it comes to the probability of each receiver, it is necessary to divide by the number of receivers m, that is, the prior receiver fault probability is p (H1)/m. The new required $P_{md}$ can be obtained from the lateral risk and the fault of the prior receiver.

The present disclosure provides a GBAS integrity risk allocation method based on key satellites, which reduces the redundancy between the calculated value of protection level and the true value of error, improves the preset risk value of protection level, makes the final result reflect the real situation and improves the availability of the system.

Combined with the description and practice of the disclosure disclosed herein, other embodiments of the present disclosure are easy to think of and understand for those skilled in the art. The description and the embodiment are only considered to be exemplary, and the true scope and subject matter of the present disclosure are defined by the claims.

What is claimed is:

1. A GBAS integrity risk allocation system based on key satellites, comprising:
    a satellite, configured to generate satellite signals;
    a ground receiver, configured to receive the satellite signals from the satellite, to process the received satellite signals to generate processed data, and to send the processed data; and
    a user terminal, configured to receive the processed data from the ground receiver;
    wherein the ground receiver is configured to process the satellite signals by the following steps:
    reading data from an ephemeris at a certain time, and determining numbers of key satellites, key satellite pairs and key satellite groups at the certain time;
    under H2 hypothesis, allocating integrity risks by using a fault probability of satellites in the key satellite pairs or the key satellite groups, wherein the integrity risks allocated by using the fault probability of satellites in the key satellite pairs or the key satellite groups comprise integrity risks caused by dual-receiver fault and integrity risks caused by ranging source fault;
    under H0 and H1 hypotheses, allocating the integrity risks by using a fault probability of non-key satellites;
    making an integrity allocation table according to integrity risk allocation under the H0, H1 and H2 hypotheses;
    wherein under the H0 and H1 hypotheses, the integrity risks allocated by using the fault probability of non-key satellites are calculated according to the following formula:

$$IR_{H_0H_1}=IR_{H_0}+IR_{H_1},$$

wherein $IR_{H_0}$ represents the integrity risks allocated by the fault probability of non-key satellites under the H0 hypothesis and $IR_{H_1}$ represents the integrity risks allocated by the fault probability of non-key satellites under the H1 hypothesis.

2. The system according to claim 1, wherein the numbers of the key satellites, the key satellite pairs and the key satellite groups are determined by comparing a vertical protection level with an alarm limit, wherein
    when the vertical protection level calculated by an airborne terminal is higher than the alarm limit by removing a satellite from a constellation, then the satellite is one of the key satellites;
    when the vertical protection level calculated by the airborne terminal is not higher than the alarm limit by removing the satellite from the constellation, and when the vertical protection level calculated by the airborne terminal is higher than the alarm limit by removing two satellites from the constellation, then the two satellites form one of the key satellite pairs; and
    when the vertical protection level calculated by the airborne terminal is not higher than the alarm limit by removing the two satellites from the constellation, and when the vertical protection level calculated by the airborne terminal is higher than the alarm limit by removing three satellites from the constellation, then the three satellites form one of the key satellite groups.

3. A GBAS integrity risk allocation system based on key satellites, comprising:
    a satellite, configured to generate satellite signals;
    a ground receiver, configured to receive the satellite signals from the satellite, to process the received satellite signals to generate processed data, and to send the processed data; and
    a user terminal, configured to receive the processed data from the ground receiver;
    wherein the ground receiver is configured to process the satellite signals by the following steps:
    reading data from an ephemeris at a certain time, and determining numbers of key satellites, key satellite pairs and key satellite groups at the certain time;
    under H2 hypothesis, allocating integrity risks by using a fault probability of satellites in the key satellite pairs or the key satellite groups, wherein the integrity risks allocated by using the fault probability of satellites in the key satellite pairs or the key satellite groups comprise integrity risks caused by dual-receiver fault and integrity risks caused by ranging source fault;
    under H0 and H1 hypotheses, allocating the integrity risks by using a fault probability of non-key satellites;
    making an integrity allocation table according to integrity risk allocation under the H0, H1 and H2 hypotheses;
    wherein under the H2 hypothesis, the integrity risks allocated by using the fault probability of satellites in a key satellite pair or a key satellite group are calculated according to the following formula:

$$IR_{H_2}=P_iP_{md}$$

wherein $IR_{H_2}$ is the integrity risk allocated under the H2 hypothesis, $P_i$ is the fault probability of satellites in one of the key satellite pairs or one of the key satellite groups, and $P_{md}$ is a miss detection rate.

4. The system according to claim 3, wherein each satellite has k states, and if k=n+1, there are n fault states, and each fault state is expressed by $T_i$, wherein i=1, . . . , n, then an expression representing the probability P(c,O) of O fault of c satellites is as follows:

$$P(c,O) = \frac{\frac{c!}{O!}\left(\sum_{j_1=0}^{c-O}\sum_{j_2=0}^{c-O-j_1}\cdots\sum_{j_{N-1}=0}^{c-O-\sum_{i=0}^{N-2}j_i}\Delta T_1^{j_1}\Delta T_2^{j_2}\ldots\Delta T_{N-1}^{j_{N-1}}\right)}{1+\sum_{O=0}^{c-1}\left[\frac{c!}{O!}\sum_{j_1=0}^{c-O}\sum_{j_2=0}^{c-O-j_1}\cdots\sum_{j_{N-1}=0}^{c-O-\sum_{i=0}^{N-2}j_i}\Delta T_1^{j_1}\Delta T_2^{j_2}\ldots\Delta T_{N-1}^{j_{N-1}}\right]},$$

wherein a recovery index of each fault is recorded as $\Delta T_i$, and i=1 . . . n.

5. The system according to claim 3, wherein the fault probability of the satellites in the key satellite pair or key satellite group is calculated by the following formula:

$$P_i = \sum_{j=1}^{c-n} P(c,j) \times \frac{C_k^i \times C_{c-j}^{N-i}}{C_c^N},$$

i=2, 3;
wherein $P_i$ is the fault probability of the satellites in the key satellite pair or the key satellite group, P(c,j) represents a probability of j fault satellites in c satellites, N represents a number of visible satellites in the constellation, i represents indication of the key satellite pairs or the key satellite groups, wherein i=2 represents the key satellite pairs, i=3 represents the key satellite groups, k represents recovery strategy in Markov transformation process, and C represents a combination number.

6. The system according to claim 3, wherein the miss detection rate $P_{md}$ has the following relationship with a miss detection coefficient $K_{md}$:

$$K_{md}=Q(x)^{-1}(P_{md}/2),$$

wherein $Q(x)^{-1}$ is an inverse function of Q(x), wherein $$Q(x) = \frac{1}{\sqrt{2\pi}}\int_x^\infty e^{-\frac{t^2}{2}}dt,$$

Q represents a right tail function of standard normal distribution, x is a parameter, and t is an integral element;
wherein the miss detection coefficient $K_{md}$, a threshold value and a false alarm rate have the following relationship:

$$K_{md}+K_T=\eta, P_{ffd}=1-\Phi(K_T),$$

wherein $K_{md}$ represents the miss detection coefficient, $K_T$ represents the threshold value, $\eta$ represents a fault hypothesis offset, $P_{ffd}$ represents the false alarm rate, $\Phi$ represents a left tail function of standard normal distribution, wherein, $$\Phi(x) = \frac{1}{\sqrt{2\pi}}\int_{-\infty}^x e^{-\frac{t^2}{2}}dt,$$

x is the parameter, and t is the integral element.

7. The system according to claim 3, wherein under the H0 and H1 hypotheses, the integrity risks allocated by using the fault probability of non-key satellites are calculated according to the following formula:

$$IR_{H_0H_1}=IR_{H_0}+IR_{H_1},$$

wherein $IR_{H_0}$ represents the integrity risks allocated by the fault probability of non-key satellites under the H0 hypothesis and $IR_{H_1}$ represents the integrity risks allocated by the fault probability of non-key satellites under the H1 hypothesis.

8. The system according to claim 7, wherein the integrity risks allocated by using the fault probability of non-key satellites under the H0 hypothesis satisfy:

$$IR_{H_0}=P_{ffmd},$$

wherein $P_{ffmd}$ is a probability of fault-free miss detection rate,
wherein the integrity risks allocated by using the fault probability of non-key satellites under the H1 hypothesis satisfy:

$$IR_{H_1}=P(H_1)P(HMI|H_1),$$

where $P(H_1)$ is the probability of fault under H1 hypothesis, and $P(HMI|H_1)$ represents a probability of generating dangerous misleading information under the H1 hypothesis;
wherein the probability of generating dangerous misleading information under the H1 hypothesis is calculated by the following formula:

$$P(HMI|H_1) = 3\int_{-\infty}^\infty \iint_{LB<E_2+E_3<UB} \frac{1}{2\pi\sigma_v\sigma_v}e^{-\frac{E_2^2}{\sigma_v^2}-\frac{E_3^2}{\sigma_v^2}}dE_2dE_3 \frac{1}{\sqrt{2\pi}\,\sigma_{v1}}e^{-\frac{E_1^2}{\sigma_v^2}}dE_1,$$

wherein $E_1$, $E_2$ and $E_3$ are differential correction values of a receiver No. 1, a receiver No. 2 and a receiver No. 3 respectively, UB and LB are upper and lower bounds of an error sum of the receiver No. 2 and the receiver No. 3, $\sigma_v$ is a vertical error standard deviation, and $\sigma_{v1}$ is a vertical error standard deviation of the receiver No. 1 after differential correction.

9. A GBAS integrity risk allocation system based on key satellites, comprising:
a satellite, configured to generate satellite signals;
a ground receiver, configured to receive the satellite signals from the satellite, to process the received satellite signals to generate processed data, and to send the processed data; and
a user terminal, configured to receive the processed data from the ground receiver;
wherein the ground receiver is configured to process the satellite signals by the following steps:
reading data from an ephemeris at a certain time, and determining numbers of key satellites, key satellite pairs and key satellite groups at the certain time;

under H2 hypothesis, allocating integrity risks by using a fault probability of satellites in the key satellite pairs or the key satellite groups, wherein the integrity risks allocated by using the fault probability of satellites in the key satellite pairs or the key satellite groups comprise integrity risks caused by dual-receiver fault and integrity risks caused by ranging source fault;

under H0 and H1 hypotheses, allocating the integrity risks by using a fault probability of non-key satellites;

making an integrity allocation table according to integrity risk allocation under the H0, H1 and H2 hypotheses;

wherein, the integrity risks caused by the dual-receiver fault are expressed by the following formula:

$$IR_{2RR\_failures} = P(H_{2RR\_failures})P(HMI|H_{2RR\_failures}),$$

wherein $IR_{2RR\_failures}$ represents the integrity risks caused by the dual-receiver fault, $P(H_{2RR\_failures})$ represents the probability of the dual-receiver fault, and $P(HMI|H_{2RR\_failures})$ represents the probability of generating dangerous misleading information under the H2 hypothesis.

10. The system according to claim 9, wherein the probability of double receiver fault is calculated by the following formula:

$$P(H_{2RR\_failures}) = \binom{M}{2}\left(\frac{10^{-5}}{M}\right)^2\left(1 - \frac{10^{-5}}{M}\right)^{M-2},$$

wherein M represents a number of the receivers;

the probability of generating dangerous misleading information under the H2 hypothesis is calculated by the following formula:

$$P(HMI | H_{2RR\_failures}) = 3\int_{-\infty}^{\infty}\int_{-\infty}^{\infty}\int_{LB_2}^{UB_2} \frac{1}{\sqrt{2\pi}\sigma_v} e^{-\frac{E_3^2}{2\sigma_v^2}} dE_3 \frac{1}{2\pi\sigma_{v1}\sigma_{v2}\sqrt{1-\rho^2}}$$
$$e^{-\frac{E_1^2}{\sigma_{v1}^2} + \frac{2E_1 E_2}{\sigma_{v1}\sigma_{v2}} - \frac{E_3^2}{2\sigma_v^2}},$$

wherein E1, E2 and E3 are differential correction values of a receiver No. 1, a receiver No. 2 and a receiver No. 3 respectively, $UB_2$ and $LB_2$ are respectively upper and lower bounds of an error of the receiver No. 3, $\sigma_v$ is a vertical error standard deviation, $\sigma_{v1}$ is a vertical error standard deviation of the receiver No. 1 after differential correction, $\sigma_{v2}$ is a vertical error standard deviation of the receiver No. 2 after differential correction, and $\rho$ is a correlation coefficient of the differential correction value $E_1$ and the differential correction value $E_2$.

11. The system according to claim 1, wherein the integrity risks allocated by using the fault probability of non-key satellites under the H0 hypothesis satisfy:

$$IR_{H_0} = P_{ffmd},$$

wherein $P_{ffmd}$ is a probability of fault-free miss detection rate, wherein the integrity risks allocated by using the fault probability of non-key satellites under the H1 hypothesis satisfy:

$$IR_{H_1} = P(H_1)P(HMI|H_1),$$

wherein $P(H_1)$ is the probability of fault under H1 hypothesis, and $P(HMI|H_1)$ represents a probability of generating dangerous misleading information under the H1 hypothesis;

wherein the probability of generating dangerous misleading information under the H1 hypothesis is calculated by the following formula:

$$P(HMI | H_1) = 3\int_{-\infty}^{\infty}\int\int_{LB<E_2+E_3<UB} \frac{1}{2\pi\sigma_v\sigma_v} e^{-\frac{E_2^2}{\sigma_v^2} - \frac{E_3^2}{\sigma_v^2}} dE_2 dE_3 \frac{1}{\sqrt{2\pi}\;\sigma_{v1}} e^{-\frac{E_1^2}{\sigma_v^2}} dE_1,$$

wherein $E_1$, $E_2$ and $E_3$ are differential correction values of a receiver No. 1, a receiver No. 2 and a receiver No. 3 respectively, UB and LB are upper and lower bounds of an error sum of the receiver No. 2 and the receiver No. 3, $\sigma_v$ is a vertical error standard deviation, and $\sigma_{v1}$ is a vertical error standard deviation of the receiver No. 1 after differential correction.

12. The system according to claim 1, wherein, the integrity risks caused by the dual-receiver fault are expressed by the following formula:

$$IR_{2RR\_failures} = P(H_{2RR\_failures})P(HMI|H_{2RR\_failures}),$$

wherein $IR_{2RR\_failures}$ represents the integrity risks caused by the dual-receiver fault, $P(H_{2RR\_failures})$ represents the probability of the dual-receiver fault, and $P(HMI|H_{2RR\_failures})$ represents the probability of generating dangerous misleading information under the H2 hypothesis.

13. The system according to claim 12, wherein the probability of double receiver fault is calculated by the following formula:

$$P(H_{2RR\_failures}) = \binom{M}{2}\left(\frac{10^{-5}}{M}\right)^2\left(1 - \frac{10^{-5}}{M}\right)^{M-2},$$

wherein M represents a number of the receivers;

the probability of generating dangerous misleading information under the H2 hypothesis is calculated by the following formula:

$$P(HMI | H_{2RR\_failures}) = 3\int_{-\infty}^{\infty}\int_{-\infty}^{\infty}\int_{LB_2}^{UB_2} \frac{1}{\sqrt{2\pi}\sigma_v} e^{-\frac{E_3^2}{2\sigma_v^2}} dE_3 \frac{1}{2\pi\sigma_{v1}\sigma_{v2}\sqrt{1-\rho^2}}$$
$$e^{-\frac{E_1^2}{\sigma_{v1}^2} + \frac{2E_1 E_2}{\sigma_{v1}\sigma_{v2}} - \frac{E_3^2}{2\sigma_v^2}},$$

wherein E1, E2 and E3 are differential correction values of a receiver No. 1, a receiver No. 2 and a receiver No. 3 respectively, $UB_2$ and $LB_2$ are respectively upper and lower bounds of an error of the receiver No. 3, $\sigma_v$ is a vertical error standard deviation, $\sigma_{v1}$ is a vertical error standard deviation of the receiver No. 1 after differential correction, $\sigma_{v2}$ is a vertical error standard deviation of the receiver No. 2 after differential correction, and $\rho$ is a correlation coefficient of the differential correction value $E_1$ and the differential correction value $E_2$.

14. The system according to claim 3, wherein the numbers of the key satellites, the key satellite pairs and the key satellite groups are determined by comparing a vertical protection level with an alarm limit, wherein
- when the vertical protection level calculated by an airborne terminal is higher than the alarm limit by removing a satellite from a constellation, then the satellite is one of the key satellites;
- when the vertical protection level calculated by the airborne terminal is not higher than the alarm limit by removing the satellite from the constellation, and when the vertical protection level calculated by the airborne terminal is higher than the alarm limit by removing two satellites from the constellation, then the two satellites form one of the key satellite pairs; and
- when the vertical protection level calculated by the airborne terminal is not higher than the alarm limit by removing the two satellites from the constellation, and when the vertical protection level calculated by the airborne terminal is higher than the alarm limit by removing three satellites from the constellation, then the three satellites form one of the key satellite groups.

15. The system according to claim 3, wherein the integrity risks caused by the dual-receiver fault are expressed by the following formula:

$$IR_{2RR\_failures} = P(H_{2RR\_failures})P(HMI|H_{2RR\_failures}),$$

wherein $IR_{2RR\_failures}$ represents the integrity risks caused by the dual-receiver fault, $P(H_{2RR\_failures})$ represents the probability of the dual-receiver fault, and $P(HMI|H_{2RR\_failures})$ represents the probability of generating dangerous misleading information under the H2 hypothesis.

16. The system according to claim 13, wherein the probability of double receiver fault is calculated by the following formula:

$$P(H_{2RR\_failures}) = \binom{M}{2}\left(\frac{10^{-5}}{M}\right)^2\left(1-\frac{10^{-5}}{M}\right)^{M-2},$$

wherein M represents a number of the receivers;
the probability of generating dangerous misleading information under the H2 hypothesis is calculated by the following formula:

$$P(HMI|H_{2RR\_failures}) = 3\int_{-\infty}^{\infty}\int_{-\infty}^{\infty}\int_{LB_2}^{UB_2}\frac{1}{\sqrt{2\pi}\sigma_v}e^{-\frac{E_3^2}{2\sigma_v^2}}dE_3\frac{1}{2\pi\sigma_{v1}\sigma_{v2}\sqrt{1-\rho^2}}$$
$$e^{-\frac{E_1^2}{\sigma_{v1}^2}+\frac{2E_1E_2}{\sigma_{v1}\sigma_{v2}}-\frac{E_2^2}{2\sigma_v^2}},$$

wherein E1, E2 and E3 are differential correction values of a receiver No. 1, a receiver No. 2 and a receiver No. 3 respectively, $UB_2$ and $LB_2$ are respectively upper and lower bounds of an error of the receiver No. 3, $\sigma_v$ is a vertical error standard deviation, $\sigma_{v1}$ is a vertical error standard deviation of the receiver No. 1 after differential correction, $\sigma_{v2}$ is a vertical error standard deviation of the receiver No. 2 after differential correction, and $\rho$ is a correlation coefficient of the differential correction value $E_1$ and the differential correction value $E_2$.

17. The system according to claim 9, wherein the numbers of the key satellites, the key satellite pairs and the key satellite groups are determined by comparing a vertical protection level with an alarm limit, wherein
- when the vertical protection level calculated by an airborne terminal is higher than the alarm limit by removing a satellite from a constellation, then the satellite is one of the key satellites;
- when the vertical protection level calculated by the airborne terminal is not higher than the alarm limit by removing the satellite from the constellation, and when the vertical protection level calculated by the airborne terminal is higher than the alarm limit by removing two satellites from the constellation, then the two satellites form one of the key satellite pairs; and
- when the vertical protection level calculated by the airborne terminal is not higher than the alarm limit by removing the two satellites from the constellation, and when the vertical protection level calculated by the airborne terminal is higher than the alarm limit by removing three satellites from the constellation, then the three satellites form one of the key satellite groups.

* * * * *